United States Patent [19]

Burns et al.

[11] Patent Number: 4,500,163
[45] Date of Patent: Feb. 19, 1985

[54] HOLOGRAPHIC PROJECTION SCREEN

[75] Inventors: Richard H. Burns, N. Hollywood; William M. Hall, La Crescenta; Bernard P. Hildebrand, El Toro, all of Calif.

[73] Assignee: The Singer Company, Stamford, Conn.

[21] Appl. No.: 288,085

[22] Filed: Jul. 29, 1981

[51] Int. Cl.³ .................... G03B 21/56; G02B 5/32
[52] U.S. Cl. .................... 350/3.7; 350/103; 350/125; 350/129
[58] Field of Search ............... 350/97, 103, 125, 129, 350/162.16, 162.23, 320, 3.7; 358/60

[56] References Cited

U.S. PATENT DOCUMENTS

| | | | |
|---|---|---|---|
| 3,622,223 | 11/1971 | Brakell | 350/129 |
| 3,708,217 | 1/1973 | McMahon | 350/3.7 |
| 3,807,829 | 4/1974 | Close | 350/162.16 |
| 3,900,111 | 9/1975 | Meyerhofer | 350/117 |
| 3,993,401 | 11/1976 | Strehlow | 350/320 |
| 4,036,552 | 7/1977 | Lee et al. | 350/97 |
| 4,040,717 | 8/1977 | Cinque et al. | 350/124 |
| 4,095,875 | 6/1978 | Lee et al. | 350/320 |
| 4,261,635 | 4/1981 | Freeman | 350/3.72 |
| 4,372,639 | 2/1983 | Johnson | 350/3.7 |

OTHER PUBLICATIONS

Holographic and Inteferometric Viewing Screens–Dietrich Meyerhofer, Applied Optics–vol. 12, No. 9–Sep. 1973–pp. 2180–2184.

Sincerbox, "Formation of Optical Elements by Holography", IBM Technical Disclosure Bulletin, vol. 10, No. 3, Aug. 1967, pp. 267 to 268.

Primary Examiner—John K. Corbin
Assistant Examiner—William Propp
Attorney, Agent, or Firm—David L. Davis; Robert E. Smith; Edward L. Bell

[57] ABSTRACT

A projection screen is formed as at least one reflective holograms each of which, when referenced with a projector, reconstructs a defined observation pupil.

10 Claims, 6 Drawing Figures

HOLOGRAPHIC PROJECTION SCREEN

BACKGROUND OF THE INVENTION

This invention relates to viewing screens for projected light beam display systems and, more particularly, to a viewing screen which provides increased brightness within a defined observation pupil.

The viewing, or observation, pupil of a projection screen is the locus of all locations from which the image projected upon the screen may be seen, i.e., the image may be seen when the observer's eye is within the pupil, and not otherwise. There are a number of reasons why it may be desirable to control the shape and size of the observation pupil. For example, for purposes of energy conservation, it would be desirable to maximize the image brightness for observers located within the proper viewing area. It may also be desirable, for certain applications, to prevent those outside the desired viewing area from seeing the image projected on the screen.

There have been various attempts in the past to satisfy these objectives. For example, a special screen has been proposed for drive-in movie theaters where it is desired that none of the images projected on the screen can be seen outside of the paid admission area. This particular screen is a lenticular array made up of half inch square curved reflectors that reflect the incident light only into the desired area. Another proposed technique introduces a small amount of lubricant between two sheets of smooth aluminum which are then rolled between metal rollers under high pressure. The result is a large number of depressions which tend to act like randomly distributed retro-reflectors. Yet another technique is to arrange an array of lenslets in a linear, periodic pattern, backed by a specular or diffuse reflector. Still another technique is to use a large number of tiny glass beads which are adhered to a surface. With the proper index of refraction of the beads, the rear surface coincides with the focal sphere of the front surface, thus forming an autocollimating, or "cat's eye", configuration. Still another technique is to provide an array of corner reflectors arranged on a panel. This screen is also retroreflective since each corner reflector is retrodirective.

None of the aforedescribed attempts have proven entirely satisfactory because they do not achieve a uniform gain profile over the observation pupil, and further, except for the drive-in movie screen all of the resulting screens are retroreflecting, i.e., the light is reflected directly back into the projector with greatest intensity. In order to eliminate this problem, a specular reflector must be provided behind each element of the screen to direct the light in the desired direction. This presents a tremendous complication to manufacturing a screen. It is therefore an object of this invention to provide an improved projection viewing screen wherein the observation pupil may be precisely defined.

SUMMARY OF THE INVENTION

The foregoing and additional objects are attained in accordance with the principles of this invention by providing a projection viewing screen having a fixed size observation pupil at a predetermined position relative to the screen, the screen comprising an array consisting of a plurality of elemental screen areas each of which is formed as a hologram of the observation pupil.

BRIEF DESCRIPTION OF THE DRAWINGS

The foregoing will be more readily apparent upon reading the following description in conjunction with the drawings in which like reference numerals in different figures thereof denote like elements and wherein.

DETAILED DESCRIPTION

Figure 1:
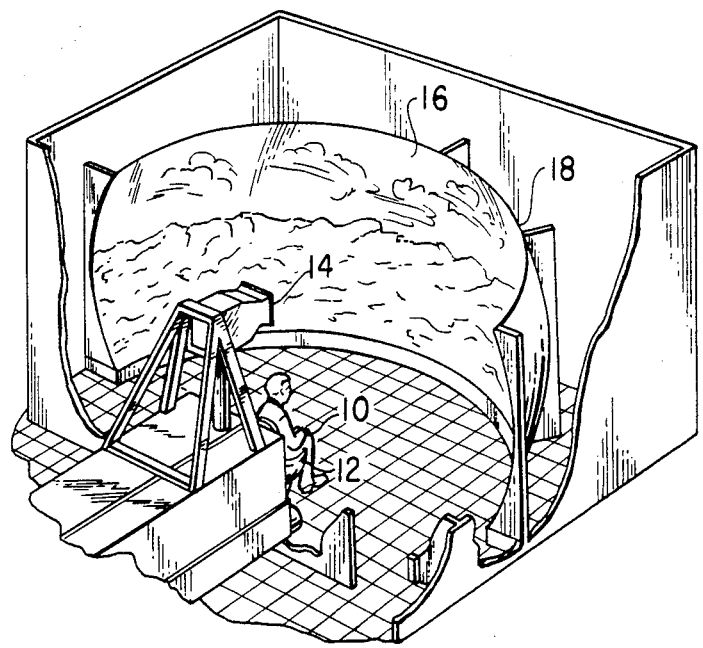
FIG. 1 is a cutaway view of the layout for a scanned laser projection system in which a screen constructed in accordance with the principles of this invention finds particular utility.

The subject invention is particularly suitable as a screen for a flight simulator system wherein an observer occupies a fixed, defined, position within a simulator cockpit and the screen surrounds the cockpit and is visible through the windows thereof. A suitable projection system projects appropriate images onto the screen in accordance with the particular simulation being performed. FIG. 1 shows an illustrative projection system, without a cockpit, including a screen constructed in accordance with the principles of this invention.

As shown in FIG. 1, an observer 10 is located at a fixed position, illustratively seated on a chair 12, with respect to the projection system. The projection system includes an image projector 14 which forms an image 16 of the scene to be viewed on the screen 18. Illustratively, the screen 18 is of spherical shape, having its center at a position between the observer 10 and the projector 14. As is clear from FIG. 1, it is desirable that the head of the observer 10, and in particular the observer's eyes, remain in the observation pupil of the projection system. An illustrative system of this type is fully disclosed in U.S. patent, by Clyde M. Whitby, and assigned to the assignee of the present invention, now U.S. Pat. No. 4,297,723 the contents of which are hereby incorporated by reference.

The system shown in FIG. 1 is designed for an application where the observer 10 remains seated. Therefore, the observation pupil for the system may be considered as fixed, both as to position and size, and may illustratively be defined as a circle of 12" diameter in a substantially vertical plane in the region of the observer's head.

Figure 2:
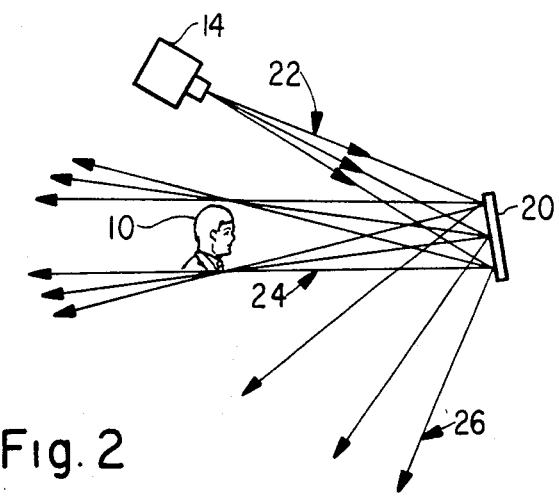
FIG. 2 schematically illustrates the reconstruction geometry for an elemental hologram of a screen constructed in accordance with the principles of this invention.

A hologram can record, and later be used to project, any desired wave. In accordance with the principles of this invention, the screen 18 is made up of an array consisting of a plurality of elemental screen areas 20, each of which is formed as a hologram of the observation pupil. Each of the holograms reproduces a solid angle of light of uniform intensity in a preferred direction, this preferred direction being toward the observation pupil surrounding the head of the observer 10, as shown in FIG. 2. The object of the hologram which has been recorded on the elemental screen area 20 is at the observation pupil, so that when any portion of the hologram is illuminated by a beam 22 from the projector 14, the diffracted light 24 passes through the reconstructed object, which is also at the observation pupil, surrounding the head of the observer 10. The elemental screen area 20 is tilted to throw any specular reflections 26 away from the observer 10.

Figure 3:
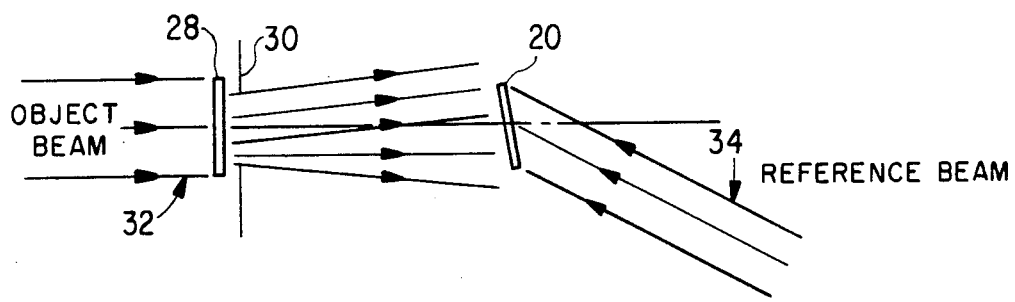
FIG. 3 schematically illustrates the formation of an illustrative holographic element in accordance with the principles of this invention.

FIG. 3 illustrates a simple geometry for forming the hologram on the elemental screen area 20. In the simplest configuration, the object is a ground glass diffuser 28 and a mask 30 which together form an extended source the size and shape of the desired pupil. The elemental screen area 20 is a photosensitive plate which may be an ordinary silver halide photographic plate that is bleached for high efficiency after processing, or alternatively, it may be dichromated gelatin. The plate 20 is exposed by an object beam 32, which passes through the object formed from the masked diffuser 28, and by the reference beam 34, as is well known in the art of holography. Screen 18 is formed of an array of the individual holographic plates described above, with each of the holograms having been formed at a position relative to the observation pupil that it has on the screen 18.

Figure 4:
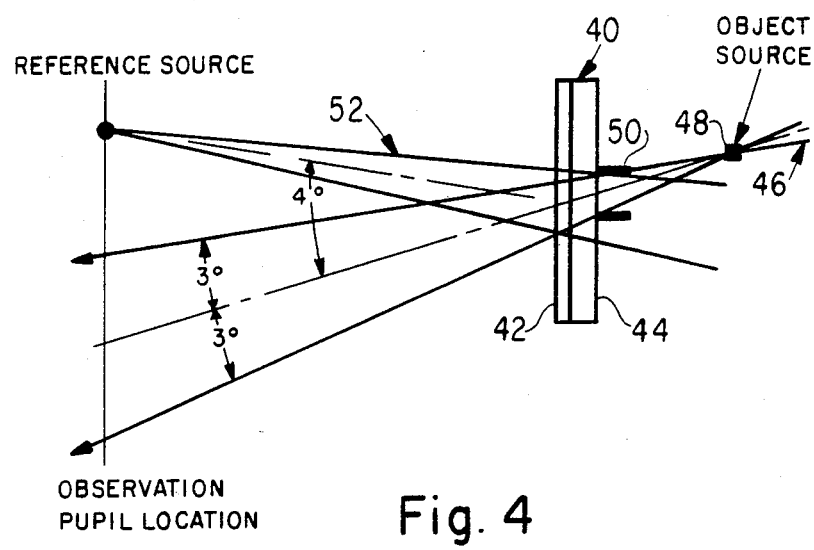
FIG. 4 schematically illustrates the formation of a preferred holographic element in accordance with the principles of this invention.

Since a screen formed as described above provides a holographic reproduction of a diffuser, it may be expected to have whatever speckle the original diffuser had. Speckle is a phenomenon that occurs whenever coherent light is used to illuminate a diffuse surface. It appears as a grainy texture superimposed on the diffuse surface, but yet projected out in space to the plane of the observer and therefore it can be quite irritating to the observer. It is therefore desirable to eliminate the speckle. There is no speckle when coherent light is reflected from a smooth surface like a mirror. In that case, a spherical wave-front is produced without any of the interference which causes the speckle. FIG. 4 illustrates a preferred way of forming an elemental screen area which eliminates the speckle. As shown in FIG. 4, the elemental screen area 40 is formed as an emulsion photoresist 42 on a glass plate 44. Speckle is eliminated by making the hologram with a specular object beam. Accordingly, the object beam 46 is focused at a point 48 behind the elemental screen area 40. The object beam 46 passes through an aperture 50 and interferes with the reference beam 52 to produce a hologram which diffracts light in the direction of the observation pupil in such a manner that the light appears to emanate from the point 48 behind the hologram, i.e., the hologram is essentially equivalent to a holographic lens with a mirror behind it and with the optical axis tilted in the direction of the observation pupil. The screen 18 then consists of an array of holographic lenticles covering the entire surface area, each one made with the proper geometry to reflect into the observation pupil. The diffracted light will not exhibit speckle, because the reconstructed wave-front is smooth.

Figure 5:
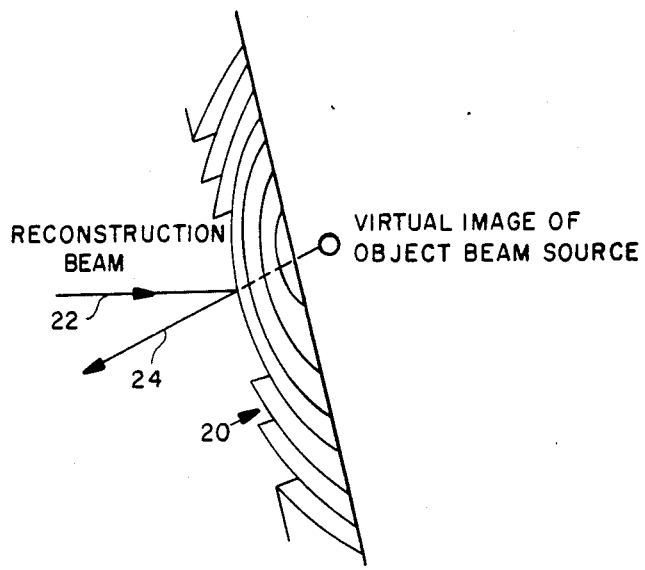
FIG. 5 schematically illustrates the surface structure of a reflective hologram constructed in accordance with the principles of this invention.

Reflective holographic screens of this sort can be made to diffract light very efficiently by developing the photographic emulsion so as to produce sharply blazed surfaces. FIG. 5 illustrates the spherical surface structure of a specular hologram showing the desired blazed surfaces, and also showing the light beam geometry during construction of the hologram.

Figure 6:
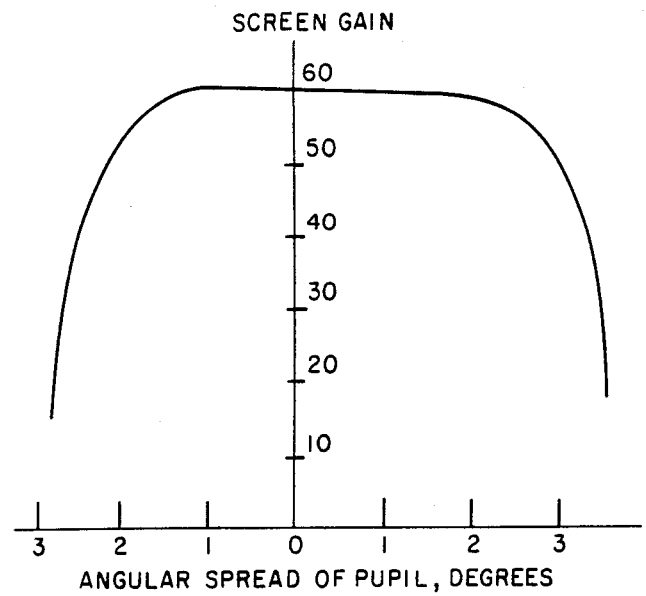
FIG. 6 illustrates the reflected intensity profile across the observation pupil of a holographic screen constructed in accordance with the principles of this invention.

An experimental specular holographic screen sample was fabricated using the exposure geometry shown in FIG. 4. The holographic plate was a standard 4"×4" glass slide with a photoresist emulsion applied. The 457.9 nanometer line from an argon laser was used for the object and reference beams. A 21×21 array of holographic lenticles on two millimeter centers was made by stepping the plate incrementally. The developed hologram was then aluminized to produce a high efficiency reflective hologram. The holographic screen was first tested by illuminating the entire screen sample with a coherent laser beam. The screen reflected a cone of light, reconstructing the object beam. There was almost no structure observed within the observation pupil due to interference between the individual holographic lenticles, and there was no observed speckle. Next, the screen was illuminated with a small raster scanned blue, yellow and green composite laser beam with the scanning beam diameter approximately 1 to 2 millimeters. No speckle or structure was observed within the reflected beam, as before. Finally white light imagery from a slide projector was projected onto the holographic screen sample and the projected imagery showed high contrast on the screen, the resolution being limited only by the size of the holographic lenticular array structure. The intensity profile in the reflected beam with white light illumination was measured by a phototometer at different angular positions with a small entrance aperture. The intensity profile was uniform across the central $\frac{2}{3}$ of the reflected cone with a rapid fall off at the edges. The total angular spread of this sample screen was approximately 6° to the 50% intensity points, as shown in FIG. 6. The screen gain was measured by measuring the brightness of the projected white light on the surface of the holographic screen, and comparing that with the brightness of a standard diffuse white reflecting surface with the same illumination. A peak gain of approximately 60 was observed, where the gain is defined as the brightness of the screen divided by the brightness of the diffuse surface.

If the screen 18 is spherical and, when viewed from above, if the system including the projector, the observation pupil and the screen exhibit axial symmetry, all holograms at the same height will be identical. This simplifies the manufacture. To reduce the production cost of the holographic screen elements, the holographic pattern may be embossed on the surface of a plastic chip. The technology for doing this is similar to that used for replicating ornamental diffraction gratings and for video disc records.

Since a hologram diffracts light, for a multicolor display, a simple holographic screen would produce displaced pupils by the ratio of the wavelength of the different color lights. This color fringing reduces the size of the pupil and the efficiency of the system. Therefore, in order to achieve a fixed size multicolor pupil, the individual color pupils must be made larger so that when superimposed upon each other, the common area is the desired size. Alternatively, a thick film hologram could be made sequentially with red, green and blue lasers to superimpose upon each other the three single color pupils.

Although the disclosed screen has been described as comprising an array of elemental screen areas, each of which is constructed as a single discrete hologram, it is apparent that the entire screen may be constructed as a single continuous hologram of the observation pupil. Furthermore, and alternatively, each of the elemental screen areas may be constructed as an array of small elemental holograms each of which would be the size of a pixel in a scanning projection system, and hence the size of each of the holograms would depend upon the system resolution.

While the techniques described herein refer only to a reflective screen, these techniques are easily adaptable to form a transmissive holographic screen.

Accordingly, there has been disclosed an improved projection screen. It is understood that the above-described embodiments are merely illustrative of the application of the principles of this invention. Numerous other embodiments may be devised by those skilled in the art without departing from the spirit and scope of this invention, as defined by the appended claims.

We claim:

1. A front projection viewing screen having a fixed size observation pupil at a predetermined position relative to the screen, said screen comprising an array of a plurality of elemental screen areas wherein each of said elemental screen areas is formed of at least one elemental reflective hologram of the observation pupil, and wherein each of said holograms is made with a specular object beam.

2. The screen according to claim 1 wherein said screen is of generally spherical shape and said observation pupil is within the sphere of said screen.

3. The screen according to claim 1 wherein said screen is of generally spherical shape and wherein said elemental holograms disposed at a given height are identical.

4. The screen according to claim 1 wherein each of said elemental holograms is formed with an object beam focused at a point behind said elemental hologram.

5. The screen according to claim 4 wherein during the formation of each of said elemental holograms a masked aperture is positioned between said point and said elemental hologram to direct light from said point to said observation pupil.

6. A method for producing a front projection viewing screen having a fixed size observation pupil at a predetermined position relative to said screen comprising the steps of:
   (a) forming a plurality of elemental reflective holograms of said observation pupil using a specular object beam in each such formation; and
   (b) arranging said elemental holograms in an array to form the viewing surface of said screen;
   wherein each of said elemental holograms is formed at a position relative to said observation pupil that each of said elemental holograms has in said array.

7. The method according to claim 6 wherein the arranging step includes the step of positioning said elemental holograms to form a generally spherical screen around said observation pupil.

8. The method according to claim 6 wherein the arranging step includes the step of positioning said elemental holograms to form a generally spherical screen and wherein during the forming step all of said elemental holograms which are to be positioned at a given height are formed to be mutually identical.

9. The method according to claim 6 wherein the forming step includes the step of focusing said object beam at a point behind said elemental hologram.

10. The method according to claim 9 wherein the forming step further includes the step of positioning a masked aperture between said point and said elemental hologram to direct light from said point to said observation pupil.

* * * * *